(12) United States Patent
Ozalas et al.

(10) Patent No.: US 10,878,168 B1
(45) Date of Patent: Dec. 29, 2020

(54) METHOD FOR PERFORMING A LAYOUT VERSUS SCHEMATIC TEST FOR A MULTI-TECHNOLOGY MODULE

(71) Applicant: Keysight Technologies, Inc., Santa Rosa, CA (US)

(72) Inventors: Matthew Ozalas, Novato, CA (US); Anne Marie Hawkins, Santa Rosa, CA (US); Praveen Vs, Bangalore (IN); Rameshwar Singh, Gurgaon (IN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/723,385

(22) Filed: Dec. 20, 2019

Related U.S. Application Data

(63) Continuation of application No. 15/231,649, filed on Aug. 8, 2016, now abandoned.

(51) Int. Cl.
*G06F 30/398* (2020.01)
*G06F 113/20* (2020.01)

(52) U.S. Cl.
CPC ........ *G06F 30/398* (2020.01); *G06F 2113/20* (2020.01)

(58) Field of Classification Search
USPC ......................................................... 716/112
See application file for complete search history.

(56) References Cited

U.S. PATENT DOCUMENTS

| | | | |
|---|---|---|---|
| 9,881,120 B1 * | 1/2018 | Ginetti | ................... G06F 30/36 |
| 2007/0101307 A1 | 5/2007 | Ueda | |
| 2009/0055789 A1 | 2/2009 | McIlrath | |
| 2013/0305194 A1 * | 11/2013 | Wang | ................... G06F 30/398 |
| | | | 716/52 |

* cited by examiner

*Primary Examiner* — Eric D Lee

(57) ABSTRACT

A method for operating a data processing system that causes the data processing system to test the consistency between a schematic description of an electronic circuit and a physical implementation of that circuit includes a master device having a plurality of component devices connected by a network of conductors is disclosed. Each of the component devices has a plurality of package pins that connect the component device to the network of conductors. Information specifying a schematic netlist generated from the schematic description and specifying a layout description of the physical implementation is received by the data processing system. The layout description specifies the network of conductors. The data processing system determines any package shorts in the component devices and generates a layout netlist from the layout description. The layout netlist is compared with the schematic netlist.

16 Claims, 4 Drawing Sheets

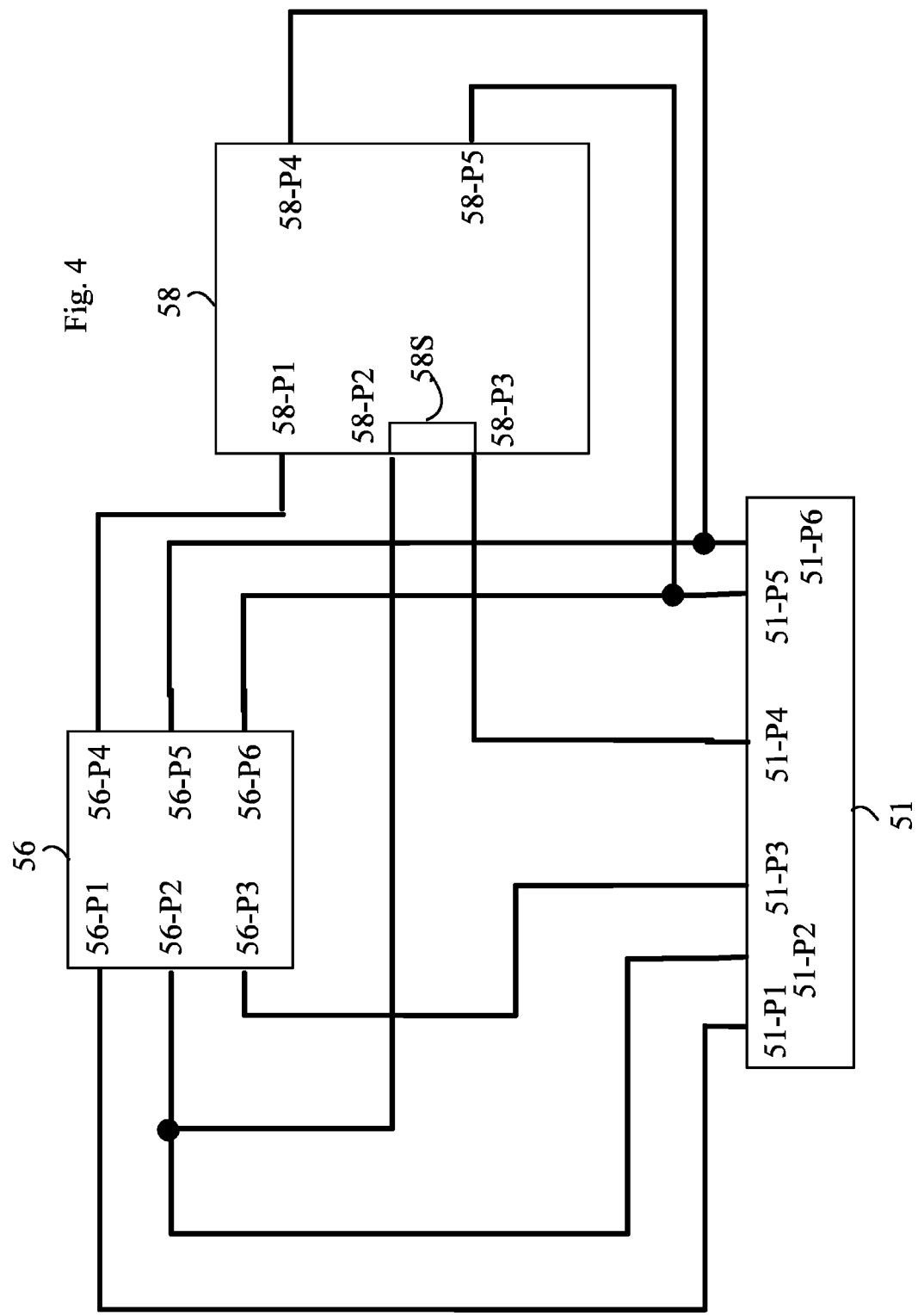

METHOD FOR PERFORMING A LAYOUT VERSUS SCHEMATIC TEST FOR A MULTI-TECHNOLOGY MODULE

RELATED APPLICATION

This application is a continuation of U.S. patent application Ser. No. 15/231,649 filed on Aug. 8, 2016.

BACKGROUND

Electronic systems are typically constructed from a plurality of modules assembled on a substrate such as a printed circuit board (PCB). Each module may be a single semiconductor chip or a collection of electronic devices that have been prepackaged into the module. Each module may include components that have been constructed using different technologies.

For example, most wireless products built today employ a variety of different technologies to create a functional end product. Different technologies perform better for different applications. In something as complicated as a smart phone, it is much more efficient in terms of cost, size, time and performance to employ different technologies to different functional aspects in a design. This allows each piece to be optimized separately so that the resulting product will perform better overall. However, this approach also creates challenges in integration. For example, the power amplifier integrated circuit might work very well alone, but when it is integrated with a filter and antenna, additional problems may arise such as the antenna detuning the amplifier.

The final device is typically designed from an electronic schematic by laying out the various components in the schematic using a computer aided design (CAD) tool or tools. Different design tools are optimized for different technologies. Typically, the CAD tool is used to connect different components by electrical conductors that are fabricated from conducting segments that can include patterned metal structures in metal layers that overlie a component or wire bonds that connect a device to a metal layer segment in a surrounding printed circuit board, etc. Metal segments in one layer of metal can be connected to segments in other layers by metal-filled vias that run perpendicular to the plane of the metal layers. The number of segments for a complex device can be in the millions.

Since the cost of a manufacturing error is significant, even for test runs, systems for verifying that the device as layout for manufacturing is in agreement with the electrical schematic that describes the final device have been developed. These testing systems are typically referred to as layout versus schematic (LVS) test programs. In these systems, the design from the CAD tool used to do the layout is matched against the schematic by generating lists, referred to as netlists, from the physical layout and independently from the schematic. A netlist details all of the component devices in the device that are connected to each continuous conductor in the device. The individual conductor in question is referred to as a net. If the netlist generated from the layout does not match the netlist generated from the schematic, there are errors in the layout that must be corrected before the layout can proceed to prototyping and manufacturing.

Unfortunately, these LVS test programs are technology dependent. Hence, doing an equivalent test with a multi-technology device presents significant challenges.

SUMMARY

The present invention includes a method for operating a data processing system and computer readable media that causes a data processing system to execute that method. The method causes the data processing system to test the consistency between a schematic description of an electronic circuit and a physical implementation of that circuit which includes a master device having a plurality of component devices connected by a network of conductors. Each of the component devices is characterized by a plurality of package pins that connect the component device to the network of conductors. The method includes receiving information specifying a schematic netlist generated from the schematic description and receiving information specifying a layout description of the physical implementation, the layout description includes information specifying the network of conductors. The data processing system determines any package shorts in the component devices and generates a layout netlist from the layout description. The layout netlist is compared with the schematic netlist, and any discrepancies between the layout netlist and the schematic netlist are reported.

In one aspect of the invention, information specifying the network of conductors includes information defining a plurality of conductive segments that connect the plurality of component devices together.

In another aspect of the invention, determining the package shorts for one of the component devices includes receiving information on any package pins that are shorted together with the one of the component devices.

In another aspect of the invention, determining the package shorts for one of the component devices includes receiving information specifying a component device connection network in that one of the component devices, the component device connection network includes a plurality of conductive segments connecting a plurality of component devices within the one of the component devices; and determining if the connection network generates a short between two package pins of the one of the component devices.

In another aspect of the invention, the information specifying the component device connection network includes information identifying a sub-set of the plurality of conductive segments in the component device connection network that would contain a package short for that one of the component devices if such a package short exists in the one of the component devices.

In another aspect of the invention, the component device connection network includes a plurality of patterned metal layers and wherein the sub-set of the plurality of conductive segments includes only conductive segments on a sub-set of patterned metal layers.

In another aspect of the invention, the component devices in the master device comprise two component devices that are constructed using different technologies.

In another aspect of the invention, the master device includes a compound component device and determining the package shorts includes iteratively examining each one of the component devices in the compound component device to determine if a package short exists in that one of the component devices.

BRIEF DESCRIPTION OF THE DRAWINGS

FIG. 4 illustrates a possible schematic diagram for the master device shown in FIG. 3.

DETAILED DESCRIPTION

The final device that is to be manufactured can be viewed as a hierarchical collection of component devices that are connected by a network of electrical conductors (referred to as simply "conductors" in the following discussion). The final device occupies the top level of this hierarchy. At the bottom level of the hierarchy are devices that are not a collection of other devices, e.g. resistors, capacitors, transistors, etc. There may be any number of intermediate levels. Each intermediate level includes a network of conductors that connects one or more devices that include component devices that are themselves hierarchical in nature.

To simplify the following discussion, the top level device will be referred to as the "master device". The devices that make up a level in the hierarchy will be referred to as the "component devices" of that level. Component devices that are not hierarchical in nature will be referred to as "simple devices". Resistors, capacitors, inductors, etc. are examples of simple devices. It should be noted that at an intermediate level in the hierarchy, there may be simple devices and component devices that are themselves hierarchical devices.

The network of conductors at each level will typically be a three-dimensional network so that conductors can cross over and under one another without being shorted. The network can be formed by etching metal layers in a multi-metal layer structure in which two overlying conductive layers are separated by a layer of insulator that can also be patterned to form a conducting via connecting conducting structures on the separate layer. The network can also include connections made between conductors on the top layer of the multi-layer structure and component devices via wire bonds, ball bonds to packages, or similar over the surface connections.

Figure 1:
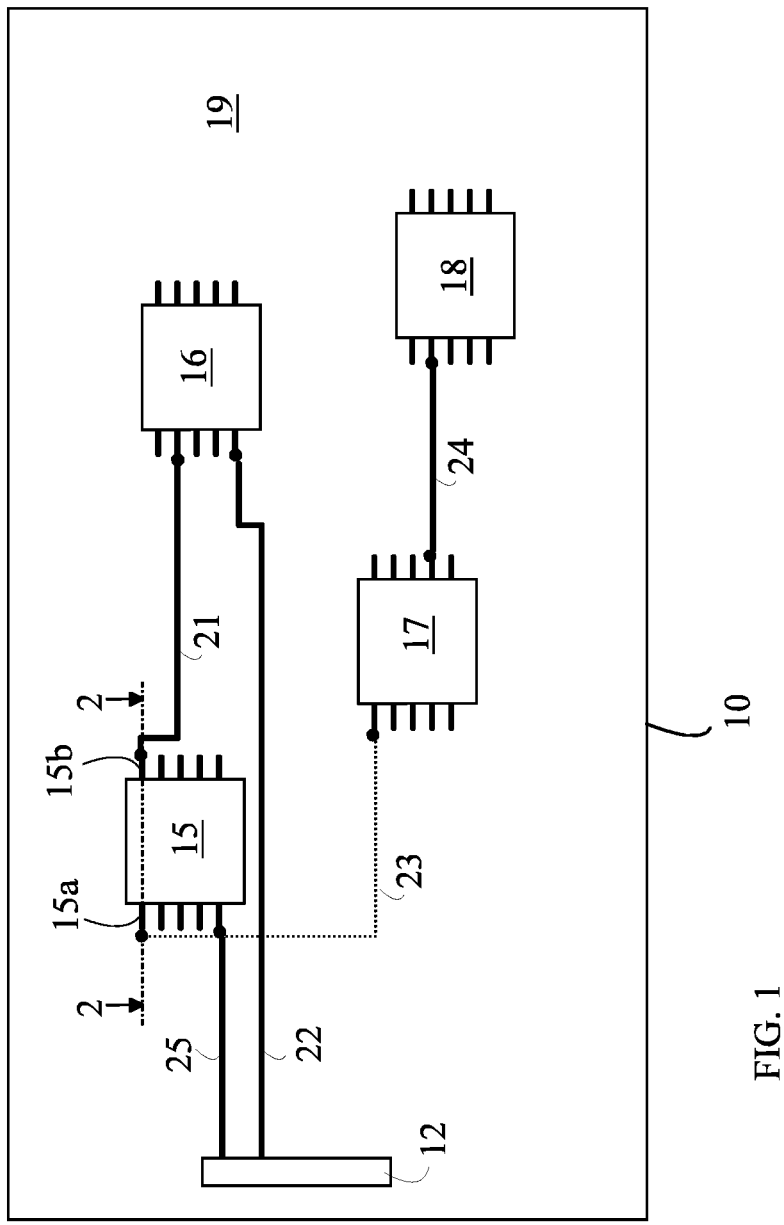
FIG. 1 is a top view of a master device constructed from a plurality of modules on a PCB.
Figure 2:
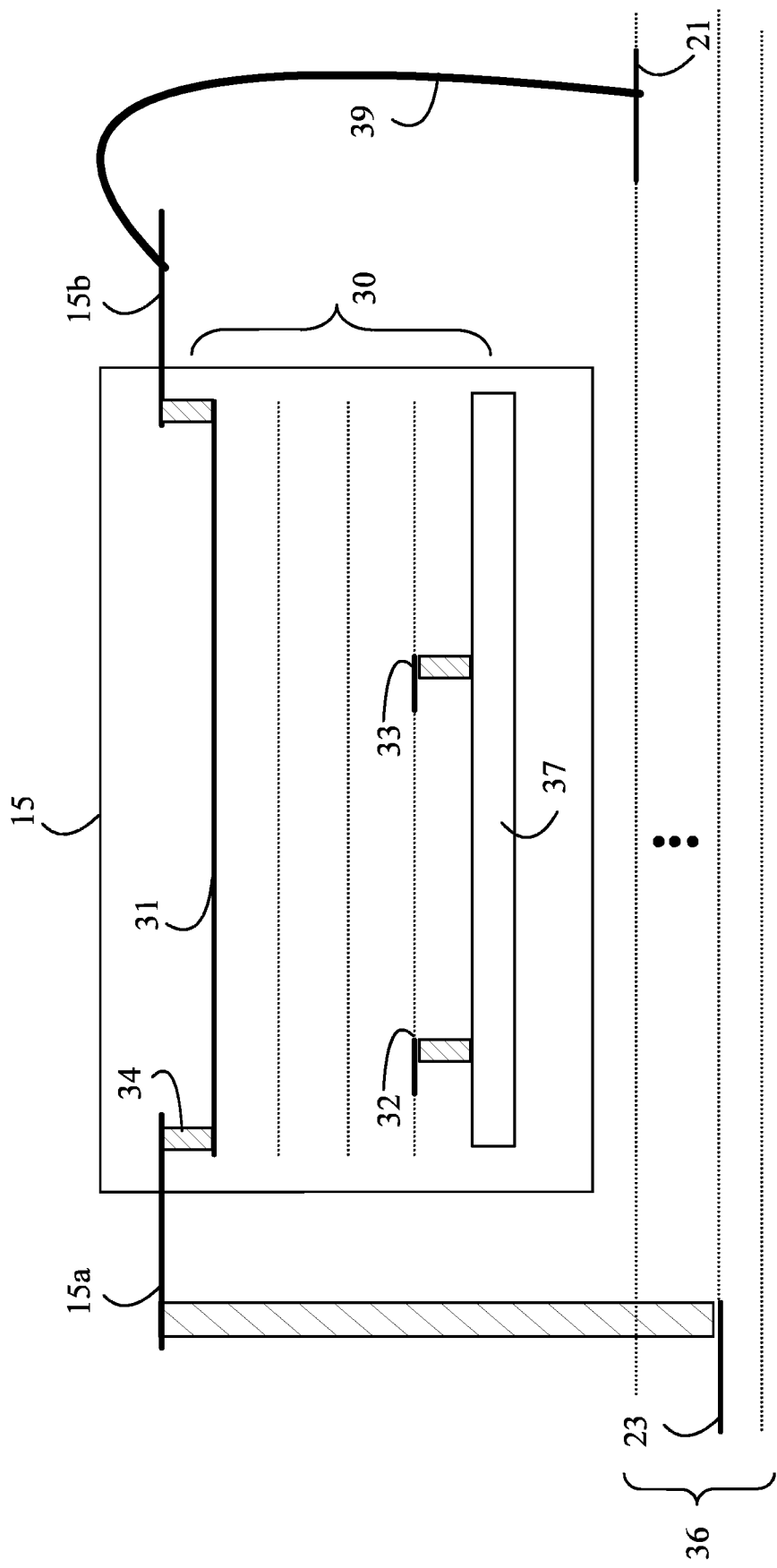
FIG. 2 is a cross-sectional view of a portion of master device 10 through line 2-2 shown in FIG. 1.

Refer now to FIGS. 1 and 2, which illustrate a master device constructed from a plurality of modules on a PCB. FIG. 1 is a top view of master device 10, and FIG. 2 is a cross-sectional view of a portion of master device 10 through line 2-2 shown in FIG. 1. Master device 10 includes four component devices shown at 15-18 that are connected to various conductors in PCB 19. To simplify the drawing and the following discussion, only a sub-set of the conductors are shown in the figures at 21-24. The conductors of PCB 19 are formed by patterning a plurality of metal layers within PCB 19 as shown at 36 in FIG. 2. In the example shown in the figures, conductor 23 is constructed from segments within a buried metal layer that allows conductor 23 to cross the conductors shown at 22 and 25 that are constructed of segments on a top metal layer. Conductor 21 is constructed from metal segments formed in the top layer of PCB 19. The various conductors that are accessed by devices outside of master device 10 are made through a connector 12.

In this example, the component devices are connected to the various conductors in PCB 19 by package pins such as package pins 15a and 15b. Package pin 15b is connected to a trace in PCB 19 by a wire bond 39 shown in FIG. 2. To generate a netlist from the layout of the circuit on PCB 19, the software of the present invention must be able to determine if an internal short exists between any of the package pins of any of the component devices. A short between two package pins within the package will be referred to a package short in the following discussion. Absent such a short, there would be five nets in master device 10, each net consisting of one of the conductors shown in the figures. For example, conductor 21 would be a net that connects component devices 15 and 16; conductor 22 would be a net that connects connector 12 and component device 16, and so on. If, however, there is a short between package pins 15a and 15b in component device 15 as shown in FIG. 2 at 31, then conductors 21 and 23 form a single net that connects component devices 15, 16, and 17.

Refer now to FIG. 2. Component device 15 also includes a connection network constructed from a plurality of patterned conducting layers 30 that provide connections to devices on a substrate 37. Exemplary conducting segments are shown at 31-33. The metal layers can also be patterned to provide certain simple devices within the metal layers such as capacitors or inductors. Connections between conducting segments in different layers and/or substrate 37 are provided by metal filled vias such as via 34.

While component device 15 is analogous to a single packaged semiconductor chip, a component device according to the present invention is not limited to such a device. In general, a component device can be any combination of devices within a package having package pins for connecting the component device to another device at a higher level in the hierarchy of devices that make up the final master device.

The present invention is based on the observation that most of the component devices in the master device have already passed an LVS test when those parts were designed and manufactured. Hence, the most important LVS test is the one at the master device level, referred to as the master test in the following discussion. At the master device level, a component device is modeled as a block having a plurality of package pins. The schematic is a circuit with the device as a block that is connected to other blocks by conductors. To perform an LVS test, the system must know about any conductive paths through a component device that shorts two package pins of that device together so that the layout netlist correctly reflects all component devices on the highest level of the hierarchy that are connected to each net.

In one aspect of the invention, a component device is characterized by a plurality of package pins and information that specifies internal electrical shorts between the package pins. The short information can be provided by the party that supplies the component device or can be determined by the present invention from other connection information specifying the metal network within the component device. This other connection information will, in general, be technology dependent. The manner in which the electrical short information is determined from this "other connection information", will be discussed in more detail below.

For the purposes of the present discussion, a component device is defined to be a packaged electrical circuit having a plurality of package pins for connecting that electrical circuit to conductors in a larger circuit that includes a plurality of such component devices. A plurality of the package pins can be, optionally, shorted together by conductors within the component device. A master device is defined to be a circuit that includes a plurality of component devices and an electrical connection network that connects various package pins on the component devices. The master device may also have a plurality of master device package pins for connecting the master device to some other electrical circuit.

Figure 3:
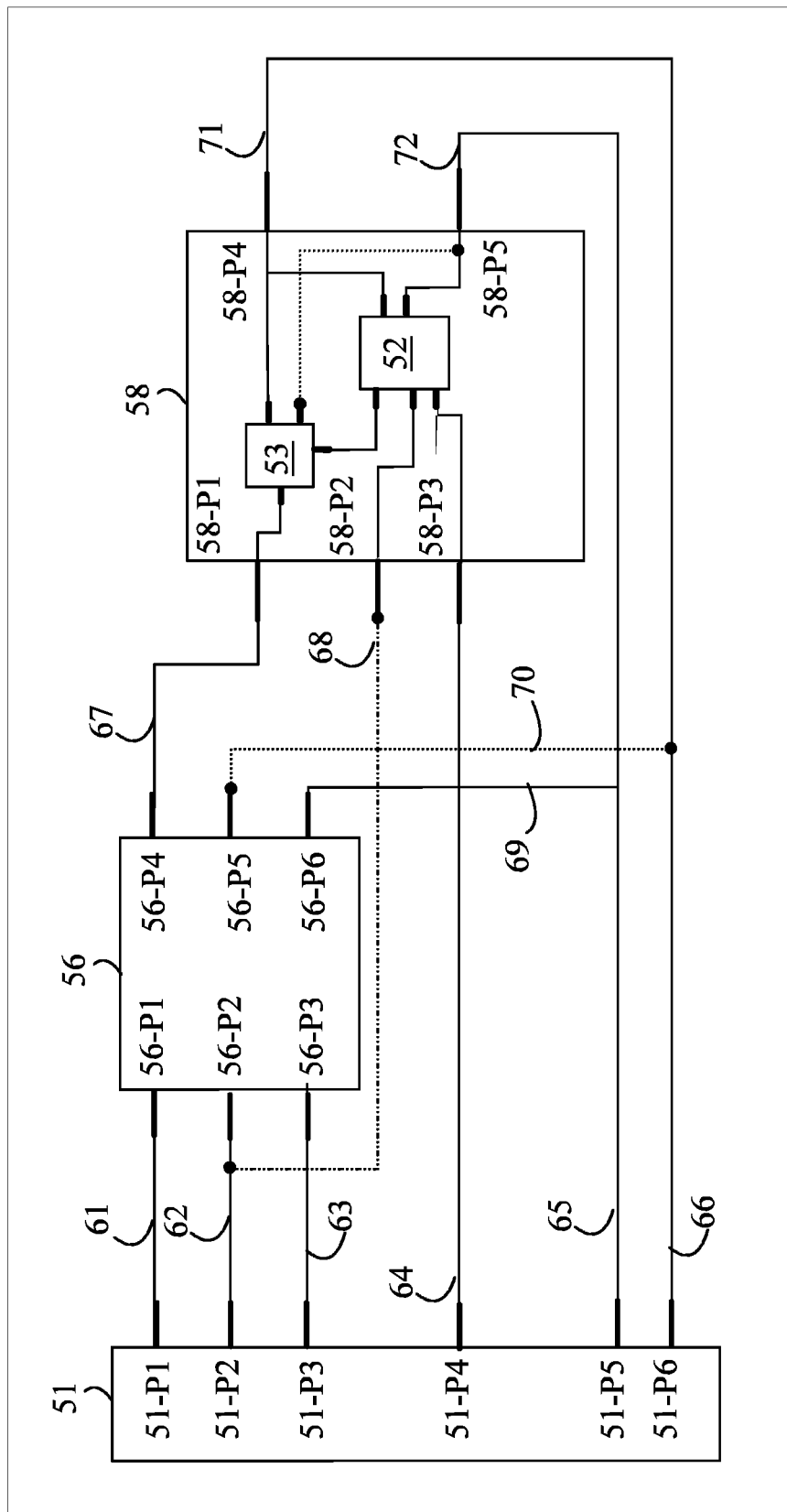
FIG. 3 illustrates the layout of a master device 50.

Refer now to FIG. 3, which illustrates the layout of a master device 50. The network of electrical connections in the master device is typically constructed from individual conducting segments. Conducting segments in master device 50 are shown at 61-72. A conducting segment can be a planar segment in a patterned layer of metal in one of the layers of a multi-metal layer structure such as the layers of a PCB or metal layers in a semiconductor device. The conducting segments in the buried PCB layers are shown as broken lines in FIG. 3, e.g. conductive segments 68 and 70. The buried conductive segments are connected to conducting segments on other metal layers by metal filled vertical connections such as vias. A conducting segment can also be a wire bond or similar connection that connects two conductors together. Individual conducting segments can be joined by metal filled vias, wire bonds, or an electrical short between package pins, etc. to form a continuous electrical conductor such as a net.

Typically, the conducting segments in a network consisting of a plurality of parallel metal layers that can be patterned are specified by the shapes and locations of the conducting segments. In the case of segments in the metal layers of a semiconductor device, the shapes are limited to polygons. A conductive segment that is more complex than a segment that can be specified by a single polygon is defined by a number of polygons that overlap one another. Vias can be specified that connect two segments in different layers. In general, the manner in which the vias are specified is technology dependent. However, for any given technology, there are rules that define when two overlapping metal segments on each layer and a via between the segments form a continuous conductor.

The collection of polygons or other shapes that define the conducting segments on a patterned metal layer will be referred to as the artwork in the following discussion. The artwork also specifies the vias between the metal layers. For any given technology, there is a format for the artwork and a rule that specifies when two overlapping segments on different metal layers are connected by a conducting via.

For component devices that are based on a chip or chips that are connected to a substrate such as a PCB within the component device, there are additional conducting segments that are not specified by the artwork for the chip(s). For example, a component device could be constructed by connecting multiple chips to a PCB substrate. Such component devices will be referred to as compound component devices in the following discussion. Component device 58 shown in FIG. 3 is an example of a compound component device. Component device 58 is constructed from component devices 52 and 53 that are connected to conductors on a PCB substrate that includes package pins 58-P1 to 58-P5.

In general, a compound component device has a substrate that includes the package pins. The individual simple component devices and/or compound component devices that make up the compound component device could be connected to the substrate by wire bonds or other structures that are not specified by the artwork on the chips. The combination of the artwork that specifies the conducting segments on the PCB and the chips and these additional conducting segments will be referred to as the augmented artwork in the following discussion. Alternatively, as discussed in more detail below, the additional connections can be modeled as a simple component device that has two package pins and a short between the package pins.

Given a set of conducting segments defined by the artwork, software to trace a conductive path between any two points to determine devices connected to a given net is known to the art and will not be discussed in detail here. Such software is part of CAD tools used to do LVS testing of conventional integrated circuits. Consider a first net that connects a first package pin on a component device and a second net that connects a second package pin on that component device. If a short exists between the first and second package pins, the first and second nets are segments in a larger net. Hence, once the shorts are known for each component device, the present invention can generate the netlist for the master device. Similarly, given the schematic of the master device, a corresponding netlist can be derived from the schematic and compared with the netlist from the layout artwork. FIG. 4 illustrates a possible schematic diagram for the master device shown in FIG. 3.

The above described embodiments of the present invention require a knowledge of the short circuits between pairs of pins on the component devices. If the manufacturer of the component device does not provide that information, or if the user of the present invention does not trust that information, the present invention can determine the shorts from the artwork associated with the component device.

Consider a component device that is constructed from an integrated circuit of some type. In general, the component device includes one or more devices that are connected to each other and/or to the package pins of the component device by a network of conductors that is defined by artwork and/or other conducting segments such as wire bonds. The CAD tool used to layout the component device can typically also output the artwork associated with that component device. In the case of a semiconductor device, the artwork specifies shapes on patterned metal layers as described above. A similar set of artwork defines the conductor network on a PCB for a component device that includes a plurality of other devices connected to a PCB substrate. In general, the format of the artwork is technology dependent. That is, the shapes in the artwork for a semiconductor device are in a computer file that has a different format than the shapes for the artwork on a PCB.

In the present invention, the user provides information for each component device in the master device. The information includes information that specifies the identity of the format of the layout artwork, the layout artwork, the package pins of the component device and information that allows the present invention to determine if a short exists between any of the package pins. The short information can be a listing of the actual shorts or the augmented artwork that allows the present invention to determine if a short exists.

If the component device is a compound component device, the component device information includes a description of the component device that is similar to that of a master device. That is, the component device information specifies each component device in the compound component device, the connection network that connects the various component devices, and the artwork for the connection network that connects the various component devices.

In one aspect of the present invention, an interface module is provided that converts the technology dependent augmented artwork to a common format that is utilized by a netlist generating routine of the present invention to determine whether there is a short between each possible pair of package pins in the component device. In another aspect of the invention, the present invention includes a module for each technology that generates the netlist from the augmented artwork for that technology. These modules can be adapted from the layout CAD tool that performs the LVS test program for that technology.

As noted above, either a master device or a component device of that master device can include component devices that have been constructed using different technologies. The process that determines the shorts between the package pins of the component devices must penetrate the design through the hierarchy of the device to the lowest level of the hierarchy and then work its way back up to the level of the master device. Each component device must be examined using a layout netlist generating engine that is particular to the technology of the component device.

The computational workload incurred to detect the package shorts from the augmented artwork for each component device in the hierarchy of devices can be significant, particularly when the underlying component devices are semiconductor chips having millions of gates and a complex multi-layer connection network. Accordingly, it is advantageous to limit the computational load based on the fact that the only knowledge that is sought is the identity of any package shorts.

In addition, reliability of existing information for any particular component device can vary significantly depending on the source of the device. For example, an existing commercial semiconductor device that has been checked with an LVS test program used in its manufacture may not need additional testing once the package shorts for that device have been provided by its manufacturing source. A component device consisting of a unique module that is provided by a small manufacturing concern may require a more thorough examination to verify the package shorts even if that information has been provided.

In some technologies, it may be known that any package shorts are formed by conducting segments on a subset of the possible layers in the connection network or by some other identifiable subset of conducting segments in the device. In this case, a partial netlist that is formed by only examining conducting segments in the subset of possible segments can be used. If two package pins are on the same net in that partial netlist then a package short exists between the two package pins in question. If not, it is assumed that no shorts exist between the two package pins in question.

For example, in a particular semiconductor technology, it may be known that any package shorts occur via conducting segments that are in a particular subset of the metal layers in that technology. That is, there is no package short that involves conducting segments on the other layers. Hence, by limiting the layout netlist generation to conducting segments on the subset of layers, a significant reduction in the computational workload for determining the shorts is obtained.

In one aspect, each component device is associated with a layout and schematic for that device. Information specifying the technology for the device and the subset of possible conducting devices to be explored in determining package shorts is also provided. In the case of a complex component device that is itself a collection of component devices, referred to as sub component devices, the identify of each of the sub component devices is also provided in the layout and schematic. The information about each of the sub component devices is also stored in the present invention.

Refer again to FIG. 3. To generate the netlists for the layout and schematic for the master device, the present invention examines each component device in the master device. In this example, there are component devices 51, 56, and 58. Component device 51 is a connector that does not include any package shorts. Component device 56 is an integrated circuit that will be assumed to lack package shorts because the manufacturer indicates that no such shorts are present.

Component device 58 is a compound component device having two component devices 53 and 52 that are mounted on a substrate within component device 58. Information specifying the layout of component device 58 and the details of each of the component devices must be provided for component device 58. Each component device in component device 58 must then be examined to determine if a short exists between the package pins of that component device. If a short exists between the package pins of one of the component devices, that short could result in a short between the package pins of component device 58, which, in turn, alters one of the layout netlists for master device 50. For the purposes of this example, it will be assumed that a package short exists between the two package pins of component device 52 that are connected to package pins 58-P2 and 58-P3 of component device 58. The existence of this short could be provided by the manufacturer of component device 52 or determined by the present invention from the layout artwork for component device 52.

For the purposes of this example, it will be assumed that there are no package shorts in component device 53. Further, there are no package shorts in component device 58 that are generated by the internal wiring in the substrate of component device 58. Hence, when the analysis of component device 58 has been completed, the present invention has determined that pins 58-P2 and 58-P3 are shorted together. The short in question is shown at 58S in FIG. 4.

Hence, one of the nets for master device 50 includes a net that corresponds to conductive segments 62, 68, and 64. The net connects package pins 51-P2, 56-P2, 58-P2, 58-P3, and 51-P5. There is a corresponding net in the schematic drawing in FIG. 4 that connects these package pins, and hence, there is no layout error detected by this net.

If, however, the designer mistakenly used a different version of component device 52 in constructing component device 58 that did not have the short in question, the package pins described above would be split between two nets. The first net would include conductive segments 68 and 72 and the second net would be conductive segment 64. In this case, the nets from the layout would not match the net in question from the schematic, and the present invention would generate an error indicating that the layout and schematic do not match.

In general, a master device can be viewed as a tree-structured device with the master device as the trunk and the first level as the component devices of the master device. If a component device is a compound device, a branch of the tree is formed by the component devices of that component device. The tree continues to branch until there are no more compound component devices. These simple component devices form the leafs of the tree. The netlist for the master device involves only the first level of component devices and the connections between those component devices. However, to determine the nets, a knowledge of the shorts in the component devices must be obtained by examining each component device that branches until the leaf nodes of that component device are examined.

If a given component device does not include a listing of the package shorts or an indication is present that the package shorts are to be determined or verified, the present invention stores its current location in the analysis of the master device and proceeds to examine the component device in question. If the component device in question is itself a compound component device, the process is repeated until a bottom level device that is not a compound device is found. The existence of package shorts for that bottom level device is then determined or verified depending on the information provided for that device. The package shorts for that bottom level device, if any, are then provided to the present invention, and the next component device at the previous level is examined in an analogous manner.

The process is repeated until all package shorts for component devices in the master device have been determined, and verified, if required. The netlists for the physical netlist and schematic of the master device are then determined and compared. If the netlists do not match, a layout error has occurred.

In the above-described embodiments, wire bonds and similar structures are added to the artwork to provide the augmented artwork. Alternatively, as noted above, such structure can be incorporated in the schematic and layout as special component devices. For example, a wire bond can be included as a wire bond component device having two package pins that have a package short between the pins and a description that instructs the present invention to not verify the indicated package short.

The present invention can be practiced on a wide range of computers or other data processing systems. The reduction in workload provided by limiting the search for package shorts to a subset of the possible conductors in a component device allows the present invention to be practiced on relatively inexpensive computers. In addition, the method of the present invention is well suited for parallel processing, as the search for shorts in one component device can be carried on in parallel for searches for shorts in other component devices.

The present invention also includes a computer readable medium that stores instructions that cause a data processing system to execute the method of the present invention. A computer readable medium is defined to be any medium that constitutes patentable subject matter under 35 U.S.C. 101 and excludes any medium that does not constitute patentable subject matter under 35 U.S.C. 101. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to test the consistency between a schematic description of an electronic circuit and a physical implementation of that circuit comprising a master device having a plurality of component devices connected by a network of conductors, each of said plurality of component devices being characterized by a plurality of package pins that connect said component device to said network of conductors, said method comprising:

receiving information specifying a schematic netlist generated from said schematic description;

receiving information specifying a layout description of said physical implementation, said layout description comprising information specifying said network of conductors;

determining any package shorts in said plurality of component devices, at least one of said component devices comprising a pre-packaged device that connects to said network of conductors by pins that are external to said one of said component devices;

generating a layout netlist from said layout description;

comparing said layout netlist with said schematic netlist; and reporting any discrepancies between said layout netlist and said schematic netlist.

2. The method of claim 1 wherein said information specifying said network of conductors comprises information defining a plurality of conductive segments that connect said plurality of component devices together.

3. The method of claim 1 wherein determining said package shorts for one of said plurality of component devices comprises receiving information on any package pins that are shorted together with said one of said plurality of component devices.

4. The method of claim 1 wherein determining said package shorts for one of said plurality of component devices comprises receiving information specifying a component device connection network in that one of said plurality of component devices, said component device connection network comprising a plurality of conductive segments connecting a plurality of component devices within said one of said plurality of component devices; and determining if said component device connection network generates a short between two package pins of said one of said plurality of component devices.

5. The method of claim 4 wherein said information specifying said component device connection network comprises information identifying a sub-set of said plurality of conductive segments in said component device connection network that would contain a package short for that one of said plurality of component devices if such a package short exists in said one of said plurality of component devices.

6. The method of claim 5 wherein said component device connection network comprises a plurality of patterned metal layers and wherein said sub-set of said plurality of conductive segments comprises only conductive segments on a sub-set of patterned metal layers.

7. The method of claim 1 wherein one of said component devices is constructed using different technology from another of said component devices.

8. The method of claim 1 wherein said master device comprises a compound component device and wherein said determining any package shorts comprises iteratively examining each one of said component devices in said compound component device to determine if a package short exists in that one of said component devices.

9. A computer readable medium containing instructions that cause a data processing system to execute a method when loaded into said data processing system, said method causing said data processing system to test the consistency between a schematic description of an electronic circuit and a physical implementation of that circuit comprising a master device having a plurality of component devices connected by a network of conductors, each of said plurality of component devices being characterized by a plurality of package pins that connect said component device to said network of conductors, said method comprising:

receiving information specifying a schematic netlist generated from said schematic description;

receiving information specifying a layout description of said physical implementation, said layout description comprising information specifying said network of conductors;

determining any package shorts in said plurality of component devices, at least one of said components or said master device comprising a pre-packaged device that connects to said network of conductors by pins that are external to said device;

generating a layout netlist from said layout description;

comparing said layout netlist with said schematic netlist; and reporting any discrepancies between said layout netlist and said schematic netlist.

10. The computer readable medium of claim 9 wherein said information specifying said network of conductors comprises information defining a plurality of conductive segments that connect said plurality of component devices together.

11. The computer readable medium of claim 9 wherein determining said package shorts for one of said plurality of component devices comprises receiving information on any package pins that are shorted together with said one of said plurality of component devices.

12. The computer readable medium of claim 9 wherein determining said package shorts for one of said plurality of component devices comprises receiving information specifying a component device connection network in that one of said plurality of component devices, said component device connection network comprising a plurality of conductive segments connecting a plurality of component devices within said one of said plurality of component devices; and determining if said component device connection network generates a short between two package pins of said one of said plurality of component devices.

13. The computer readable medium of claim 12 wherein said information specifying said component device connection network comprises information identifying a sub-set of said plurality of conductive segments in said component device connection network that would contain a package short for that one of said plurality of component devices if such a package short exists in said one of said plurality of component devices.

14. The computer readable medium of claim 13 wherein said component device connection network comprises a plurality of patterned metal layers and wherein said sub-set of said plurality of conductive segments comprises only conductive segments on a sub-set of patterned metal layers.

15. The computer readable medium of claim 9 wherein one of said component devices is constructed from a different technology than another of said component devices.

16. The computer readable medium of claim 9 wherein said master device comprises a compound component device and wherein said determining any package shorts comprises iteratively examining each one of said component devices in said compound component device to determine if a package short exists in that one of said component devices.

* * * * *